(12) United States Patent
Sparks

(10) Patent No.: US 6,648,410 B2
(45) Date of Patent: Nov. 18, 2003

(54) TEMPORARY USE SEAT COVER

(76) Inventor: Tonney E. Sparks, 15101 Blue Ash Dr., Apt. 1603, Houston, TX (US) 77090

(*) Notice: Subject to any disclaimer, the term of this patent is extended or adjusted under 35 U.S.C. 154(b) by 16 days.

(21) Appl. No.: 09/969,577

(22) Filed: Oct. 4, 2001

(65) Prior Publication Data

US 2002/0096919 A1 Jul. 25, 2002

Related U.S. Application Data

(60) Provisional application No. 60/263,517, filed on Jan. 24, 2001.

(51) Int. Cl.[7] ............................................. A47C 31/00
(52) U.S. Cl. .............................. 297/228.12; 297/228.1; 297/229
(58) Field of Search ....................... 297/228.12, 228.1, 297/229, 228, 225, 228.13

(56) References Cited

U.S. PATENT DOCUMENTS

| 974,865 A | | 11/1910 | Dreher | |
|---|---|---|---|---|
| 1,213,511 A | | 1/1917 | Linthicum | |
| 4,273,380 A | * | 6/1981 | Silvestri | 297/229 X |
| 4,383,712 A | | 5/1983 | Kaganas | |
| 4,518,198 A | * | 5/1985 | Daniels | 297/229 |
| 4,553,785 A | * | 11/1985 | Duke, Jr. et al. | 297/229 |
| 4,621,004 A | * | 11/1986 | Madsen | 297/229 X |
| 4,676,376 A | | 6/1987 | Keiswetter | 297/229 X |
| 4,840,841 A | * | 6/1989 | Madsen | 297/229 |
| 4,844,540 A | * | 7/1989 | Pegram | 297/229 |
| 4,883,701 A | * | 11/1989 | Rankin et al. | 297/229 X |
| 4,886,697 A | * | 12/1989 | Perdelwitz, Jr et al. | 297/229 X |
| 4,892,353 A | * | 1/1990 | Goddard | 297/229 X |
| 5,275,463 A | * | 1/1994 | Rocha | 297/228.12 X |
| 5,441,789 A | | 8/1995 | Walker | 297/228.12 X |
| 5,618,082 A | * | 4/1997 | Jachmich | 297/229 |
| 5,626,397 A | * | 5/1997 | Reid | 297/229 X |
| 5,707,107 A | * | 1/1998 | Melone | 297/229 X |
| 5,709,431 A | | 1/1998 | Horn | 297/228.1 |
| 5,806,925 A | | 9/1998 | Hanley | 297/228.1 |
| 6,089,659 A | * | 7/2000 | Toyota | 297/228.12 X |
| 6,135,635 A | * | 10/2000 | Miller et al. | 297/229 X |

FOREIGN PATENT DOCUMENTS

FR      1464782      11/1966

* cited by examiner

*Primary Examiner*—Rodney B. White
(74) *Attorney, Agent, or Firm*—Richard C. Litman (57) ABSTRACT

A temporary use seat cover comprises a flat, rectangular sheet with an exposed surface of moisture absorbent fabric and at least a partial backing of a material providing a high coefficient of friction to grip the underlying upholstery material and preclude slippage, upon its opposite upholstery contact surface. Two straps extend from the upper edge, for securing about a vehicle seat headrest. Additional straps may be provided extending across the back of the upper and lower portions of the cover, for extending around the back of the seatback and beneath the forward edge of the seat bottom for additional security. The present seat cover is particularly useful in protecting costly vehicle upholstery materials from soiling or other damage, and also protects the occupant of the vehicle from burns to bare flesh which may occur when contacting certain upholstery materials which have been overheated in the sun on a hot day.

20 Claims, 7 Drawing Sheets

*Fig. 7C*

TEMPORARY USE SEAT COVER

CROSS-REFERENCE TO RELATED APPLICATION

This application claims the benefit of U.S. Provisional Patent Application Serial No. 60/263,517, filed Jan. 24, 2001.

BACKGROUND OF THE INVENTION

1. Field of the Invention

The present invention relates generally to protective covers for seating, and more particularly to a temporary use cover adapted for quick and easy installation and removal from a vehicle seat. The present cover includes a soft, absorbent cloth outer surface, i. e., the surface away from the upholstery, with at least a portion of the opposite upholstery contact surface having a soft plastic or rubberized backing material with a high coefficient of friction to grip the underlying upholstery material. A series of straps is used to secure the device to the underlying seat.

2. Description of Related Art

Over the years, automobiles have become increasingly more luxurious, even in the case of base and economy models. Where once leather was used for upholstery in only very costly or exotic cars, it is now possible to find relatively economical automobiles, and even light trucks and vans, with such costly upholstery materials.

Regardless of the economic level of the vehicle in which such upholstery materials are used, they are nonetheless still relatively costly, and in fact even lesser vinyl and cloth materials tend to be of higher grades (and thus more expensive) for increased durability and longevity, than was provided in the past. As a result, people are more concerned with taking care of the materials in such vehicles, especially when considering that owners tend to keep their vehicles longer than in the past. When considering that it could cost well over a thousand dollars to have the seats reupholstered using a costly material, the concern of automobile owners is understandable.

Another factor that many vehicle owners are well aware of, particularly in warmer and/or sunny climates, is that vinyl and leather upholstery surfaces become quite hot when exposed to the sun. This is especially true of darker colors and even more so of black upholstery. However, most vehicle upholstery tends to be in darker colors, so this is a problem with the majority of vehicles on the road. Occupant (s) entering a vehicle which has been parked in the sun on a warm day, have been known to receive burns to exposed flesh from the overheated upholstery under such conditions.

As a result, many people install aftermarket covers to protect the upholstery and/or to provide some degree of comfort in hot weather. However, most such aftermarket upholstery kits are cumbersome to install and are not easily removed, which results in their being left in place for an extended period on the vehicle seats to conceal the beauty of the underlying original upholstery.

Accordingly, a need will be seen for a temporary use seat cover adapted for ease of placement upon and removal from a single vehicle seating surface. The present temporary cover provides protection to the underlying upholstery from water, sand, grease from soiled clothing, etc., which may be deposited upon a seating surface from a person who has been swimming, working on the car, or engaged in other informal activities. Moreover, the present temporary cover also protects the occupant from possible burns from overheated upholstery materials, by providing a soft fabric (e. g., terrycloth) layer between the occupant and the underlying upholstery. This is particularly critical for persons wearing shorts, swimsuits, or other attire wherein the thighs or other exposed skin areas may come in contact with the upholstery.

A discussion of the related art of which the present inventor is aware, and its differences and distinctions from the present invention, is provided below.

U.S. Pat. No. 974,865 issued on Nov. 8, 1910 to Charles L. Dreher, titled "Sanitary Seat Cover," describes a temporary use cover formed of a sheet of paper. Such material obviously does not possess the absorbency and moisture repellency of the present cover, with its fabric upper or outer surface and optional plasticized or rubberized back coating. Moreover, the Dreher cover does not have any form of high friction grip to preclude slippage. The Dreher cover cannot be secured about a headrest, as it includes only a clip for securing over the upper edge of a seatback. Moreover, the Dreher cover is not washable, as is the present cover.

U.S. Pat. No. 1,213,511 issued on Jan. 23, 1917 to Henri C. Linthicum, titled "Seat Cover," describes a temporary use cover similar to the Dreher cover discussed immediately above. The Linthicum cover is draped over the seatback to extend down both the front and back surfaces thereof. An elongate tie extends from the end of the cover disposed at the lower back of the seatback, and is wrapped around the opposite side of the seatback and cover to secure the cover to the seat. The Linthicum cover is wasteful of material in that it must include sufficient material to extend down the back of the seat as well as the front, since the attachment ties extend from the corners of the cover positioned at the lower rear of the seatback. Moreover, the Linthicum cover cannot attach to a headrest, but rather drapes over the straight upper edge of the seatback. No absorbency or moisture repellency is disclosed.

U.S. Pat. No. 4,383,712 issued on May 17, 1983 to Jose Kaganas, titled "Composite Seat Cover," describes a sheepskin cover having a foam intermediate layer with a backing sheet. The result: is not washable, as is the present temporary cover. Moreover, Kaganas shows only a single strap attachment for his cover, with a single strap end extending centrally respectively from the bottom and top ends of the seat back portion of his cover. Such an attachment arrangement cannot possibly be used with seats having headrests, as the single central strap cannot be secured about the headrest and would tend to slip to one side of the higher central headrest. Moreover, the Kaganas cover requires a gap between the seat bottom and seatback for passing the lower strap therethrough.

U.S. Pat. No. 4,646,376 issued on Jun. 30, 1987 to Paul C. Keiswetter, titled "Temporary Protective Seat Cover," describes a cover formed of a co-extruded plastic film having different properties on opposite sides thereof. The back surface provides a relatively high coefficient of friction to cling to the underlying upholstery material, while the front surface has a relatively low coefficient of friction to preclude adhering to the user. This material provides no moisture absorbency for absorbing perspiration or other liquid, as provided by the present cover. Moreover, the Keiswetter cover has a relatively wide top with a pocket for installing over the upper edge of the seatback, and is not adapted for securing to a narrow headrest which extends upwardly from the upper part of the seatback. No strap attachments are provided for the Keiswetter cover, as provided by the present temporary cover.

U.S. Pat. No. 5,441,789 issued on Aug. 15, 1995 to Gary A. Walker, titled "Attachable Type Beach Towel For Universal Use," describes a rectangular towel having two opposed straps extending from each end thereof. The straps are intended to wrap around some structure parallel to the edge of the towel and secure back to mating attachment points on the towel, which precludes attachment generally horizontally around the back of a vehicle seat headrest. However, Walker also provides supplemental attachment pads which must be secured to the structure to which his towel is to be attached. This precludes temporary installation, as the seat structure must be modified. In any event, Walker does not provide any moisture repellency or high friction grip for his towel.

U.S. Pat. No. 5,709,431 issued on Jan. 20, 1998 to Stephanie Horn, titled "Seat Cover For Protecting A Motor Vehicle Seat," describes a plastic cover closely resembling the cover of the Keiswetter '376 U.S. Patent discussed further above. The Horn cover utilizes the same double laminate sheet material as used by Keiswetter, but includes additional sheets peripherally secured to the opposite ends of the laminate sheet. These additional sheets, with the ends of the laminate sheet, define pockets which are installed over the upper edge of the seatback (and headrest) and around the forward edge of the seat bottom. As in the Keiswetter cover, the Horn cover does not provide any form of moisture absorbency, which feature is provided by the present seat cover.

U.S. Pat. No. 5,806,925 issued on Sep. 15, 1998 to Mark G. Hanley, titled "Breathable Protective Seat Cover," describes a temporary use cover having an absorbent upper or outer layer and a vapor permeable lower layer, which is capable of blocking the flow of liquid moisture. However, the Hanley cover utilizes two fabric layers and an underlying moisture repellent layer, rather than only a single fabric layer, as in the present towel. Hanley also provides a pocket at the top of his cover for installation over the upper end of the seat. The drawings, particularly FIG. 1, clearly show that this pocket is narrower than the remainder of the cover, and hence it may not fit over many relatively wide headrests. The strap attachment of the present cover is much more versatile, and provides for attachment to a wide variety of different seat back and headrest configurations.

Finally, French Patent Publication No. 1,464,782, published on Nov. 28, 1966, illustrates a seat cover apparently having a fabric outer material, with some form of plastic material provided on the upholstery contact side. However, this cover does not have any form of attachment means (straps, etc.). The '782 cover must rely upon the relatively high friction between the plastic material and the underlying seat for all of its attachment, whereas the cover of the present invention provides at least a pair of cooperating attachment straps to secure the cover about the headrest of a vehicle seat. The '782 cover relies upon the weight of an extension draped over the upper edge of the seat back to retain the cover on the seat back. As such, it more closely resembles the cover of the Linthicum '511 U.S. Patent discussed further above, than the present temporary use seat cover invention.

Finally, in addition to the specific patents and publications discussed above, applicant is aware of numerous other covers farther removed from his invention than those discussed above. These other covers are generally formed in two separate portions to cover the seat bottom and seat back separately, and are also generally intended for semipermanent or permanent installation and in many cases require some modification of the seat structure. They do not closely resemble the flat, single sheet configuration of the present temporary use seat cover.

None of the above inventions and patents, taken either singly or in combination, is seen to describe the instant invention as claimed.

SUMMARY OF THE INVENTION

The present invention is a temporarily installable and removable seat cover, primarily intended for use in automobiles and other motor vehicles. The present cover is particularly valuable in providing temporary protection from the elements for expensive vehicle upholsteries, and also for eliminating the hazard of burns to bare flesh for an occupant who enters a car which has been sitting in the sun on a hot day. The present temporary use seat cover is formed of materials which are completely washable in order to provide ease of cleaning when the cover is soiled or encounters a spill, etc.

The present seat cover has a rectangular configuration, resembling a towel, and includes a towel-like, moisture absorbent material on its front or upper surface, i. e., the exposed surface when the cover is placed upon a seat. The opposite surface, i. e., the upholstery contact surface, may include at least some areas having a plasticized or rubberized backing thereon (e. g., low density polyethylene, silicone rubber, etc.), providing a high coefficient of friction for gripping the underlying upholstery material and precluding sliding or movement of the cover. This coating may be disposed (e. g., laminated, sprayed, etc.) across the entire undersurface, or may be provided only partially or not at all, as desired. The coating may include a microporosity, in order to pass vapor but preclude passage of liquid moisture therethrough.

The cover also includes at least a pair of straps extending from the upper edge thereof, i. e., the edge adjacent the upper edge of the seatback when the cover is installed. These straps are preferably elastic and include mating attachment means (side latch buckles, snaps, etc.) for securing about the back of the seat headrest. Additional straps may be provided across the upper and lower portions of the back of the cover for extending across the back of the seatback and under the forward edge of the seat bottom, for additional security for the present cover. The straps extending from the upper end of the cover also provide for securing the cover in a rolled, compact condition for storage when desired. The cover may be folded lengthwise to place the two upper end straps opposite one another, and rolled from the bottom toward the top. The two straps are then crossed or twisted, passed around the rolled cover, and secured together to secure the cover for storage.

Accordingly, it is a principal object of the invention to provide a temporary use seat cover for vehicle and other seats, which cover is quickly and easily applied and removed as desired.

It is another object of the invention to provide such a temporary use seat cover having an occupant contact surface of a moisture absorbent fabric layer and an opposite upholstery contact surface having at least some areas providing a high coefficient of friction to preclude slippage of the cover when in use.

It is a further object of the invention to provide such a cover in which the entire upholstery contact surface is coated with Still another object of the invention is to provide at least one pair of headrest attachment straps for the present cover, for removably securing about the back of a vehicle seat headrest.

An additional object of the present invention is to provide additional laterally disposed straps extending across the upper and lower portions of the back of the cover, for securing about the seat back and forward portion of the seat bottom of a vehicle seat.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a temporary use seat cover for use in motor vehicles and the like, for protecting both the upholstery from damage and the occupants from potential burns due to overheated upholstery which has been exposed to the sun on a hot day. The present cover is quickly and easily installed upon and removed from a vehicle seat in a matter of seconds, providing extremely convenient use. The present cover is also quickly, easily, and compactly readied for storage, making it easy to carry in the vehicle for use as desired.

Figure 1:
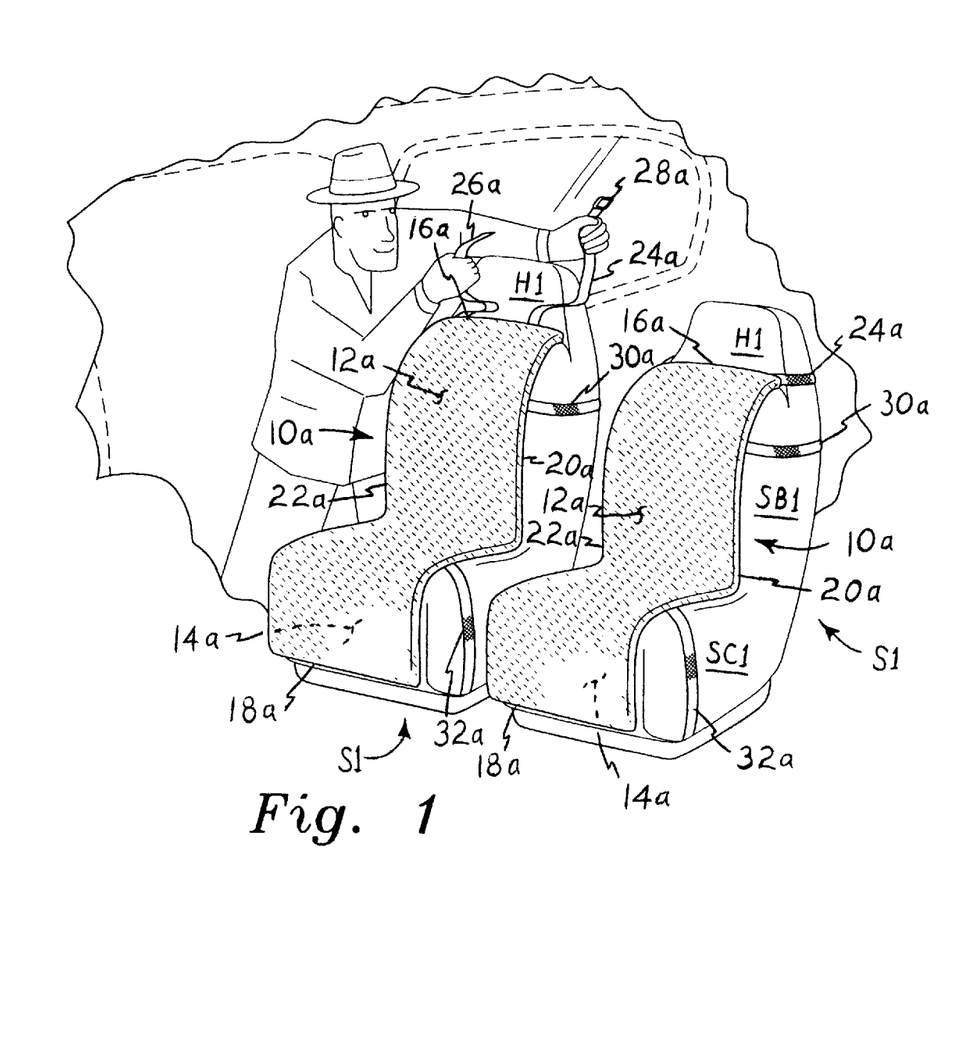
FIG. 1 is an environmental, perspective view of a pair of the present temporary use seat covers according to the present invention, showing their installation and temporary attachment to the seats within a passenger vehicle.

FIG. 1 illustrates a pair of the present covers 10a being installed upon a corresponding pair of upholstered seats S1. As noted above, many automobiles utilize relatively expensive materials for seat upholstery. Accordingly, many automobile and light truck owners wish to protect the seats S1 from undue wear and tear as much as possible. It was also noted that certain types of upholstery materials, particularly darker vinyls and leathers, absorb considerable heat within a closed parked vehicle exposed to the sun. The seating surfaces can be heated to the point of causing burns to exposed skin surfaces for occupants entering the vehicle after it has been exposed to such conditions for some time.

Figure 5:
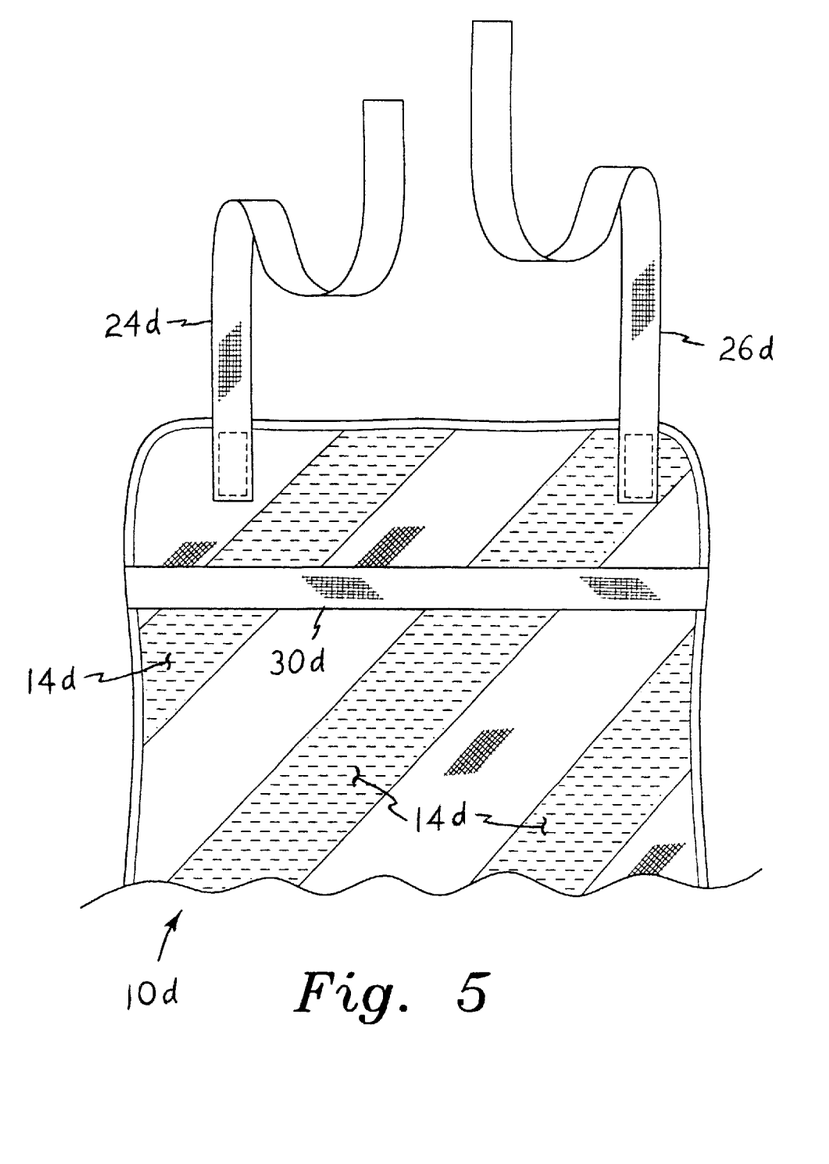
FIG. 5 is a rear elevation view of the upper portion of yet another alternative embodiment of the present seat cover, showing the pattern of partial high friction backing thereon and provision of an upper rear lateral strap.
Figure 6:
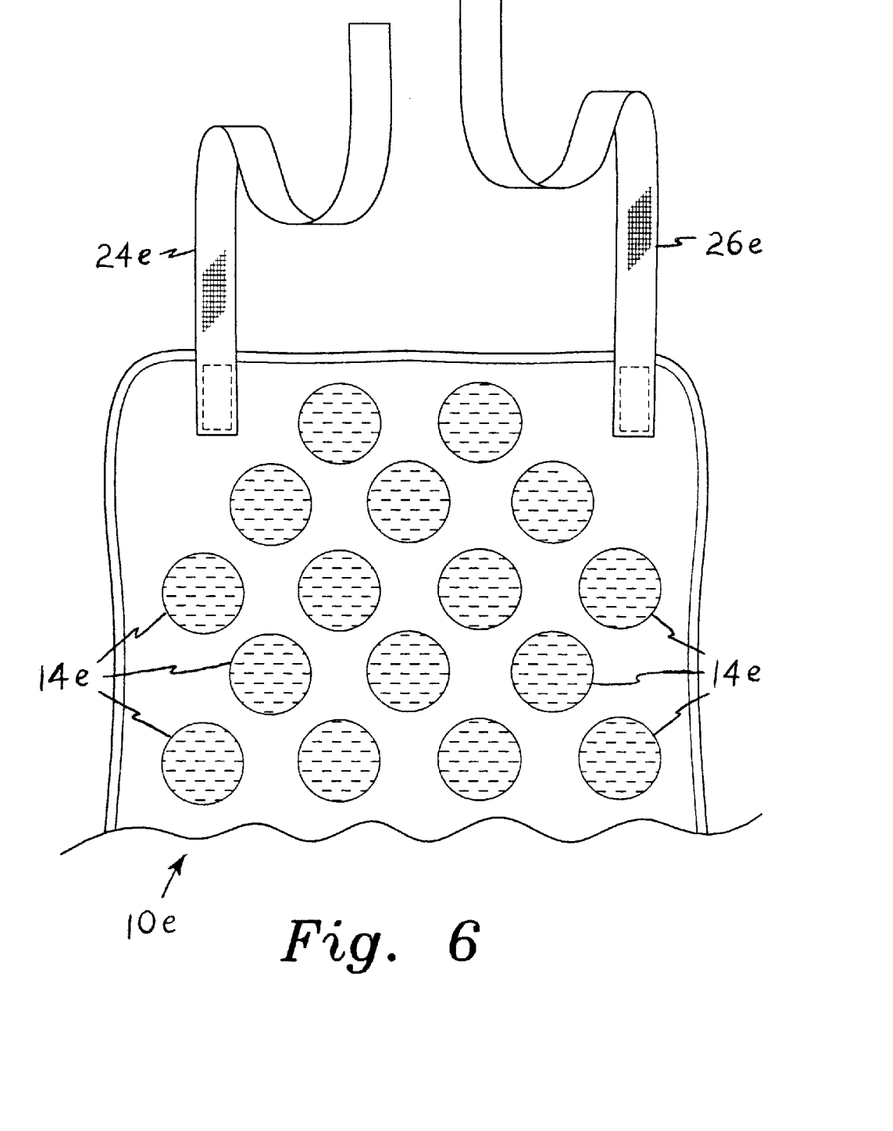
FIG. 6 is a rear elevation view the upper portion of still another alternative embodiment of the present seat cover, showing a different pattern for the high friction backing thereon.
Figures 7A, 7B:
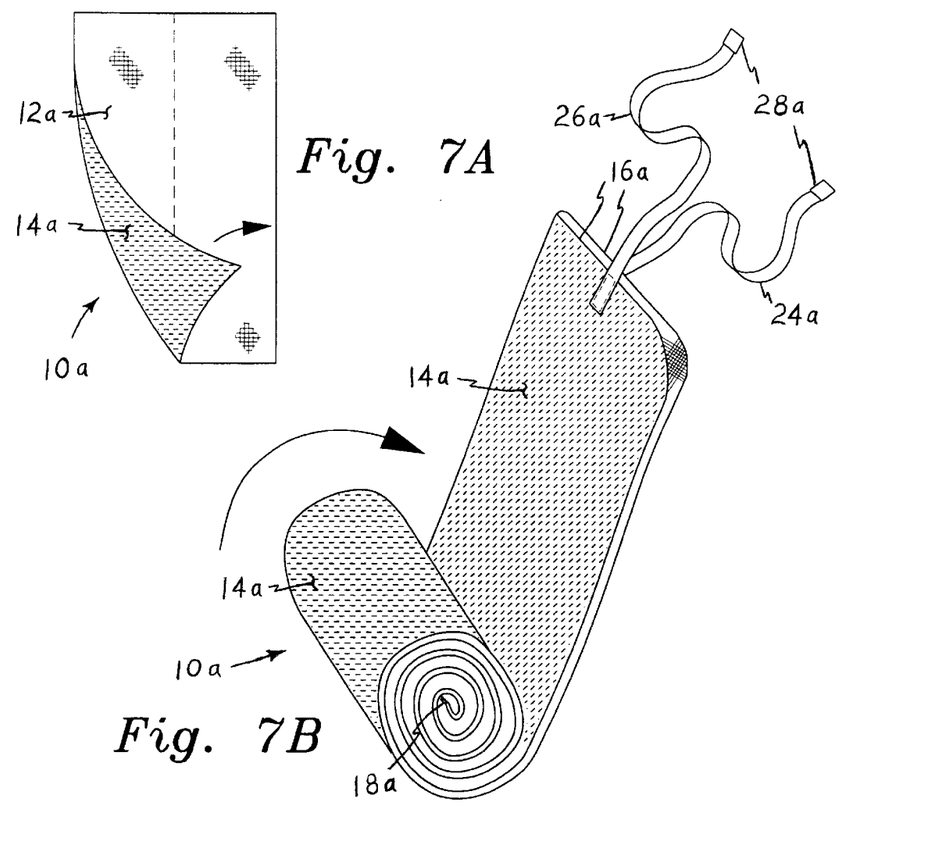
FIGS. 7A, 7B and 7C are perspective views of the present seat cover in various stages of folding for storage, showing the folding and rolling procedure.
Figure 7C:
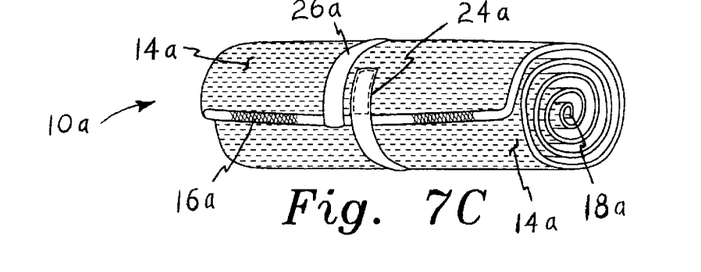

The cover 10a provides a solution to the above problems, without requiring the purchase of more costly permanent covers which cannot be easily removed when desired for the vehicle owner to enjoy the high quality of the vehicle interior. The cover 10a has a generally rectangular configuration, with an occupant contact sheet 12a (i. e., the outwardly facing sheet, when the cover 10a is installed) of a relatively soft and pliable moisture absorbent material, e. g., natural or synthetic woven fabric material, such as a terrycloth, etc. A backing material 14a for contacting the upholstery is secured (laminated, sprayed on as a coating, etc.) to the back of the occupant contact sheet 12a, and may cover a part of the back of the sheet 12a by means of a plurality of separate backing areas 14d and 14e, as shown in FIGS. 5 and 6, or may coat the entire back of the occupant contact sheet with a single coating or sheet 14a, as shown in FIGS. 7A through 7C.

The cover 10a is of a generally rectangular configuration, and has an upper or headrest securing edge 16a, an opposite base edge 18a, and opposed first and second lateral edges, respectively 20a and 22a. First and second headrest securing straps, respectively 24a and 26a, extend from the headrest securing edge 16a of the cover 10a, for extending around the back of the headrest Hi for securing the upper portion of the cover 10a to the seat S1. The remainder of the cover 10a remains secured in place on the seat S1, due to the relatively high coefficient of friction provided by the resilient upholstery contact backing 14a disposed on the back of the occupant contact layer 12a. This material may be a rubberized or plasticized material, e. g., a silicone rubber material, low density polyethylene plastic, or equivalent. Such material, along with the natural or synthetic cloth of the occupant contact surface 12a, is also easily machine washable for cleaning as required.

Figure 2:
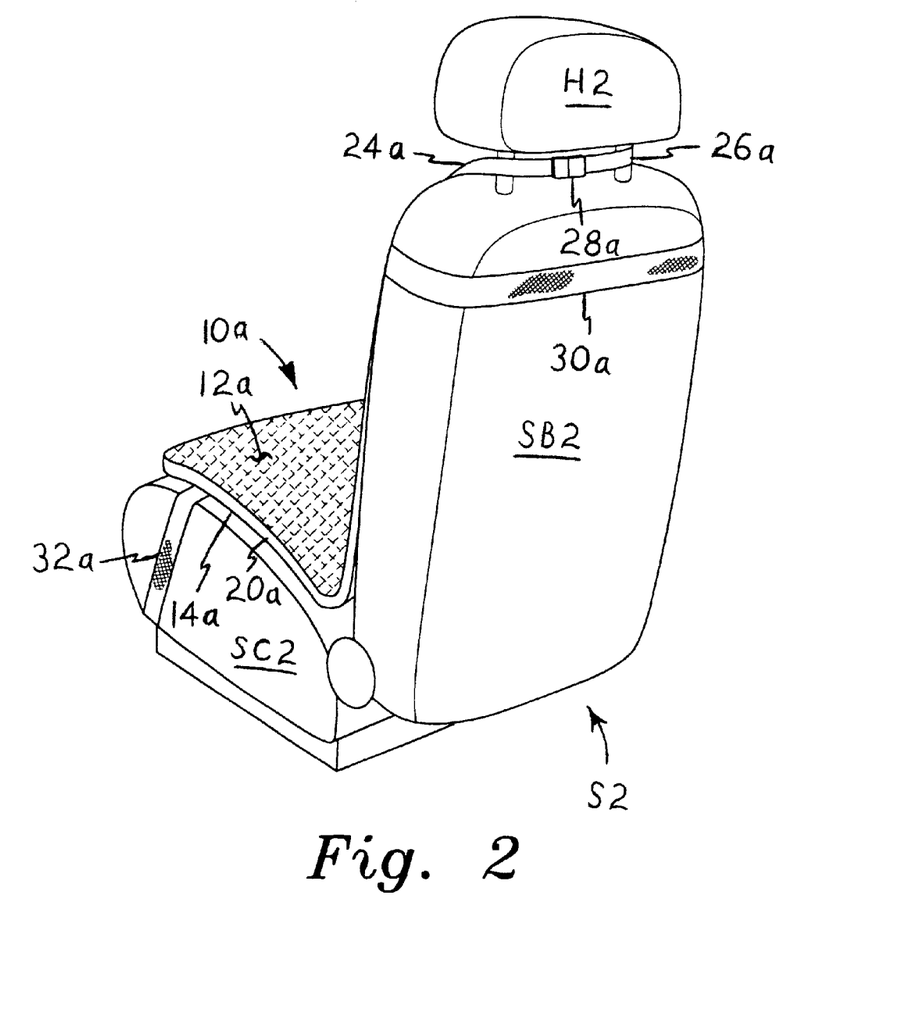
FIG. 2 is a rear perspective view of a single occupant vehicle seat, showing the present temporary use seat cover installed thereon.

Each headrest strap 24a and 26a includes mating connection means thereon, e. g., side latch buckle components 28a. It will be understood that different embodiments of the present temporary seat cover may be equipped with different headrest strap attachment means (snaps, conventional buttons, etc.) as desired. The two connector elements are secured together at the back of the headrest H1 to secure the cover 10 to the seat S1, generally as shown in FIG. 2 of the drawings. While these connectors 28a (and others) are adjustable, the headrest straps 24a and 26a are preferably formed of elastic material, in order to provide further adjustment by stretching to conform to the required fit about the headrest H1.

Additional seat cover securing means may be provided optionally for the present seat cover embodiments, if so desired. It will be noted that the seat cover 10a of FIGS. 1 and 2 also includes a seatback securing strap 30a extending laterally across the back of the cover (i. e., the upholstery contact sheet or material 14a side) near the headrest securing edge 16a of the cover 10a, and a seat cushion or bottom securing strap 32a extending laterally across the back of the cover 10a near the base edge 18a of the cover 10a. These two straps 30a and 32a are each single, unitary components, and extend in unbroken lengths from their respective attachment points at the first and second edges 20a and 22a of the cover 10a. As no connecting means is required for these straps 30a and 32a, they are each formed of an elastic material to provide the required adjustment for fit about different sizes and configurations of seats S1, etc.

The seatback securing strap 30a is passed over the back of the seatback, as shown with the seatback SB2 in FIG. 2, while the seat cushion or bottom securing strap 32a extends beneath the forward edge of the seat bottom or cushion, as shown with the seat cushion SC1 in FIG. 1. While these two straps 30a, 32a are not required, their inclusion with the cover 10a (and other embodiments) may be desirable in order to provide a more secure attachment of the temporary seat cover 10a to the underlying vehicle seat S1, S2, etc.

FIG. 2 illustrates a rear perspective view of the cover 10a of FIG. 1, shown installed about a different seat configuration, designated as seat S2. The seat S2 is essentially the same as the seat S1 of FIG. 1, having a seatback portion SB2 and seat cushion portion SC2, but the headrest H2 has a different configuration in that it is supported by a pair of generally vertically oriented rods or bars, for vertical adjustability. The headrest securing straps 24a, 26a extend around the back of these headrest support rods or bars to secure therebehind by means of the mating buckle components 28a, generally in the manner of the attachment of the cover 10a over the seat S1 in FIG. 1 of the drawings. It will be noted that the headrest retaining straps 24a, 26a may each be wrapped about the respective headrest support bar or rod, if so desired, for additional security.

Figure 3:
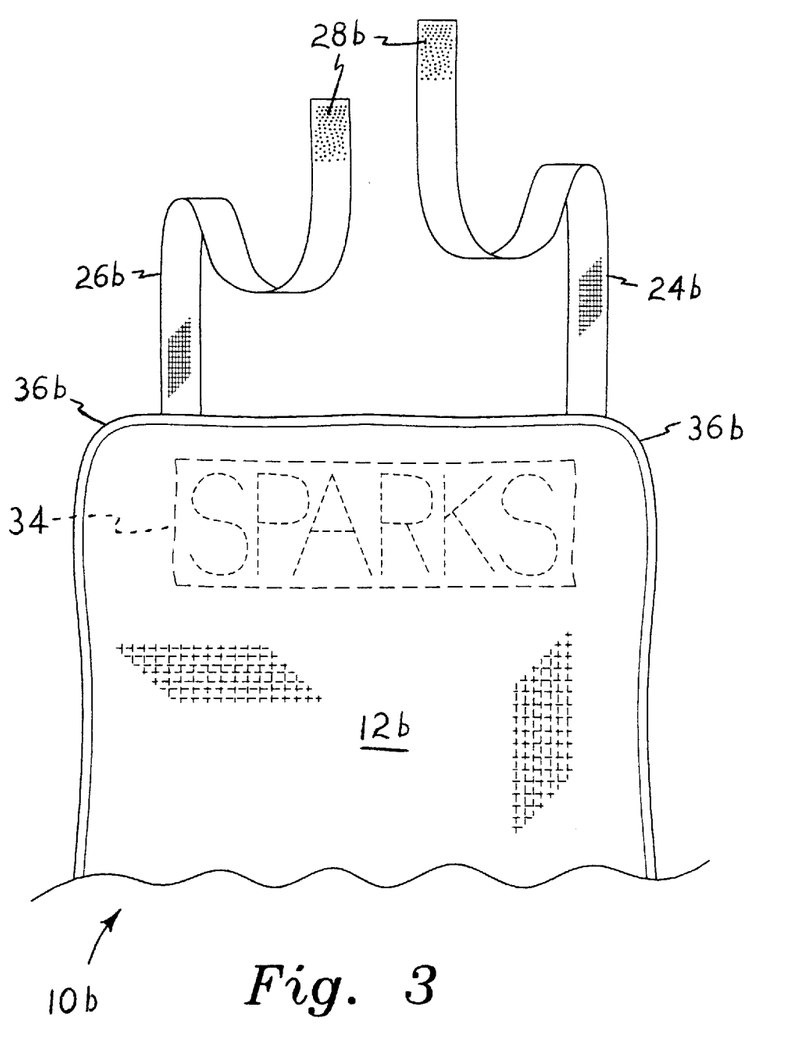
FIG. 3 is a front elevation view of the upper portion of an alternate embodiment of the present seat cover, showing display means thereon and alternative attachment means for the upper straps.

FIG. 3 provides a front elevation view of the upper portion of a second embodiment of the present temporary use cover, designated as cover 10b. The two headrest securing or retaining straps 24b and 26b differ from the straps 24a and 26a of the cover 10a of FIGS. 1 and 2, in that a different mutual attachment means is provided. The distal ends of the two straps 24b and 26b are provided with some form of mating hook and loop fabric material 28b (e.g., Velcro®), serving as the means for temporarily and removably securing the two strap ends to one another as desired. The occupant contact surface 12b of the cover 10b may also include some form of display means 34 thereon, which may be the owner's name or initials, a sports team name, etc., as desired.

Figure 4:
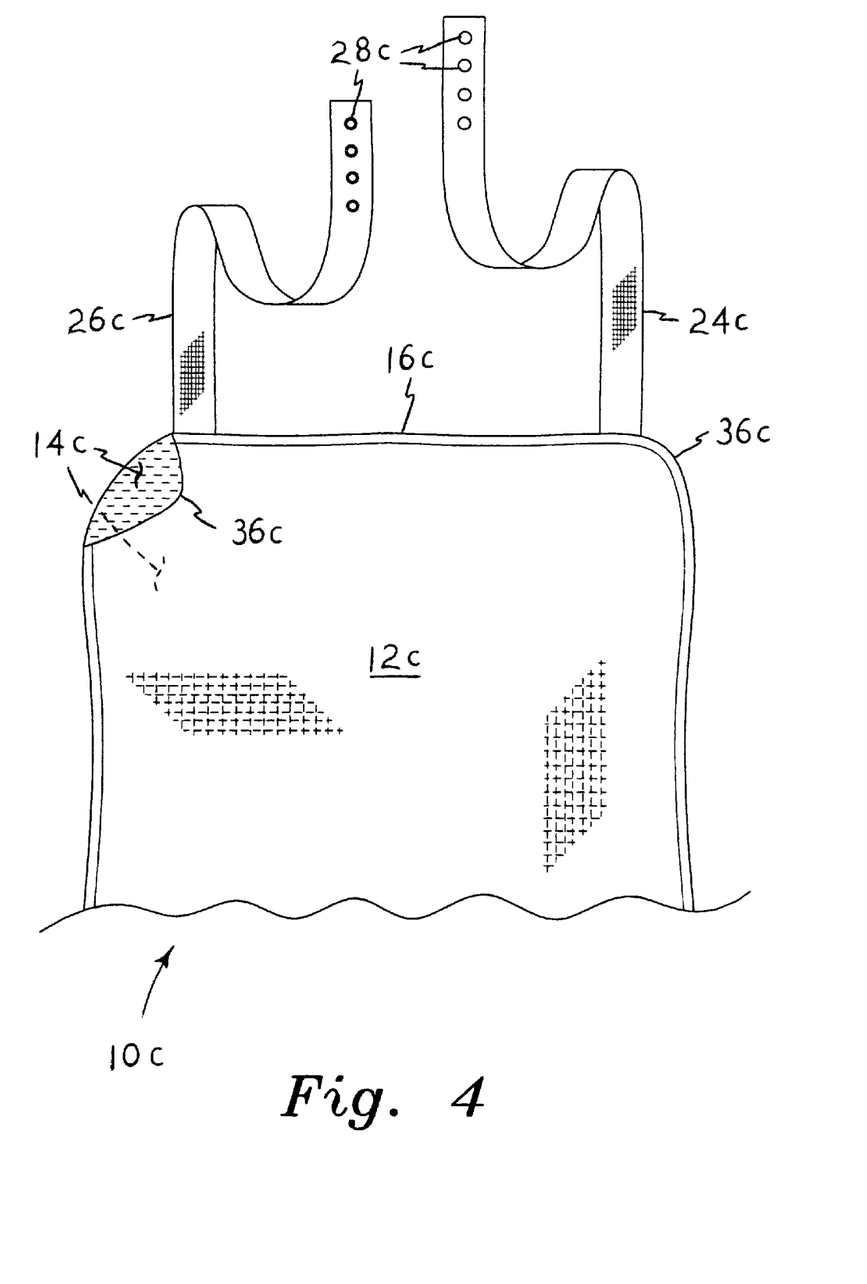
FIG. 4 is a front elevation view of the upper portion of another alternative embodiment of the present seat cover, showing further alternative attachment means for the upper straps.

FIG. 4 provides a front elevation view of the upper portion of yet another embodiment of the present invention, designated as cover 10c. The cover 10c differs from covers 10a and 10b in that the two headrest retaining straps 24c and 26c have yet another means for temporarily and removably securing them together, with a series of mating snap fasteners 28c being provided at the distal ends of the two straps 24c and 26c. While the occupant contact surface 12c of the cover 10c is devoid of any display means thereon, it will be appreciated that display means, such as the display means 34 of the cover 10b of FIG. 3, may be readily applied to the cover 10c and to other temporary use seat covers of the present invention.

The seat cover 10c includes another variation which it shares with the cover 10b of FIG. 3, in that the corners 36b and 36c of the covers 10b and 10c are rounded. This avoidance of relatively sharp corners, greatly reduces or eliminates the tendency for those corners to curl over when the cover 10b or 10c is applied to a vehicle seat. While only the corners 36b and 36c adjacent the upper or headrest attachment edges 16b and 16c are shown respectively in FIGS. 3 and 4, it will be seen that the lower corners, i. e., the corners adjacent the bottom edges of the covers, may also be rounded or radiused in a like manner, if so desired. It will be further noted that one corner 36c of the cover 10c of FIG. 4 is shown folded over, in order to show clearly the continuous and unbroken coating of the upholstery contact surface backing 14c thereover, as in the cover 10a of FIGS. 7A through 7C.

FIGS. 5 and 6 provide rear elevation views respectively of temporary use seat covers 10d and 10e. These two covers 10d and 10e differ from other covers, and from one another, in that the two headrest securing straps 24d, 26d and 24e, 26e for the respective covers 10d and 10e, have no specific mutual attachment means at their distal ends. These straps 24d, 26d and 24e, 26e may be tied together to secure them about the vehicle seat headrest as desired.

These two covers 10d and 10e also differ from other covers and from one another due to the pattern of partial coating of the upholstery contact surface material 14d and 14e respectively thereon, and the provision of a seatback retaining strap 30d for the cover 10d. In the cover 10d of FIG. 5, the upholstery contact surface material is disposed over the back of the cover in a series of diagonal stripes 14d, while the cover 10e of FIG. 6 has the partial coating applied in a series of separate spots 14e thereon. Such partial applications of the liquidproof material on the backs of the various cover embodiments, allows those partially coated covers to "breathe," passing moisture therethrough. This may be of value in the case of fabric upholstery materials which have become damp due to rain, etc., in that such a partially coated cover allows moisture to evaporate from the underlying fabric material, rather than trapping it beneath the cover if the cover is left in place. It will be seen that the various partial application patterns illustrated in the drawing Figures are exemplary, and that the variety of patterns which might be used are essentially unlimited in both size and shape of the various application areas.

FIGS. 7A through 7C illustrate the steps in folding and rolling the present cover (in any of its various embodiments) for compact and convenient storage thereof. While FIGS. 7A through 7C illustrate a cover 10a, it will be seen that the folding and rolling process is applicable to any of the covers of the present invention. The cover 10a is first folded lengthwise, with the occupant contact surface 12a to the inside and the upholstery contact surface 14a to the outside of the folded cover 10a, as shown in FIG. 7A of the drawings. (The two headrest retaining straps 24a and 26a are not shown in FIG. 7A; they may be considered to be folded behind the cover 10a as it is shown in FIG. 7A.)

In FIG. 7B, the folded cover 10a is rolled from its bottom edge 18a toward the headrest retaining straps 24a and 26a extending from the opposite headrest attachment edge 16a. Once the cover 10a has been rolled completely, the two headrest attachment straps 24a and 26a are crossed over or twisted about one another to preclude pulling the two facing sides of the folded cover apart, passed around the rolled cover 10a in opposite directions, and secured together by means of the mating buckle connectors 28a (not shown in FIG. 7C) provided at the distal ends of the two straps 24a and 26a, or other strap connection means for other cover embodiments. The result is a very compact package which may be stored as desired in any convenient area of the vehicle in which the present cover is used, for deployment and installation upon a vehicle occupant seat as desired.

In conclusion, the present temporary use seat cover in its various embodiments provides convenient protection from the typical wear and tear that costly vehicle upholstery materials may receive in normal use. The present cover embodiments are extremely compact and light weight, and may be packed for storage in any of a number of convenient locations within the vehicle, as desired. The covers may include at least some partial backing of a resilient, moisture repellent material having a high coefficient of friction to provide good grip for the covers upon the vehicle upholstery, particularly in the case of leather and vinyl upholstery materials. The upholstery contact backing material applied as a spray coating, as a laminated sheet, or otherwise deployed over the entire cover surface, thereby providing moisture repellency for the cover as well as a frictional surface for retaining the cover against the seat without sliding, or may be provided over only a portion of the cover to allow the underlying upholstery to "breathe."

Such material may also be provided with microporosity, as is well known in the art, in order to provide moisture repellency while still allowing vapor passage. The good grip provided by the resilient upholstery contact backing, allows a minimum number of fastening straps to be provided, thus reducing the cost and complexity of the present cover and simplifying its use. Accordingly, the present cover will be greatly appreciated by many vehicle owners and operators who wish to protect the interior of their vehicles and preserve their value.

It is to be understood that the present invention is not limited to the embodiments described above, but encompasses any and all embodiments within the scope of the following claims.

I claim:

1. A temporary use seat cover for an upholstered single occupant vehicle seat having a headrest, the seat cover comprising:
    a flexible, substantially rectangular occupant contact sheet of moisture absorbent material having an upper headrest securing edge, a bottom edge opposite said headrest securing edge, and opposed first and second lateral edges;
    at least one upholstery contact backing disposed over at least a portion of said occupant contact sheet, the backing comprising a soft, resilient material having a high coefficient of friction for gripping the underlying upholstery of the seat and precluding relative movement therebetween;
    a first and a second headrest securing strap extending upwardly from said headrest securing edge of said occupant contact sheet; and
    each said headrest securing strap having a distal end including mutually mating connection means for removably securing each said headrest securing strap to one another;
    whereby said first and second straps are adapted to be wrapped about the headrest for securing said occupant contact sheet to the vehicle seat when in use; and
    whereby said sheet is adapted to be formed into a roll with said first and second straps wrapped around the roll and said connection means mated, for storage when not in use.

2. The seat cover according to claim 1, wherein said at least one upholstery contact backing comprises a single ply of liquid impervious material disposed over the entirety of said occupant contact sheet.

3. The seat cover according to claim 1, wherein each said headrest securing strap is elastic.

4. The seat cover according to claim 1, further including:
    a single, continuous seatback securing strap extending laterally across said at least one upholstery contact sheet, near said headrest securing edge of said occupant contact sheet; and
    a single, continuous seat bottom securing strap extending laterally across said at least one upholstery contact sheet, near bottom edge of said occupant contact sheet.

5. The seat cover according to claim 4, wherein said seatback securing strap and said seat bottom securing strap are each elastic.

6. The seat cover according to claim 1, wherein said occupant contact sheet is formed of materials selected from the group consisting of natural and synthetic woven fabrics.

7. The seat cover according to claim 1, wherein said mutually mating connection means of each said headrest securing strap is selected from the group consisting of side latch buckles, snaps, buttons, and mating hook and loop fabric material.

8. A temporary use seat cover for an upholstered single occupant vehicle seat having a headrest, the seat cover comprising:
    a flexible, substantially rectangular occupant contact sheet of moisture absorbent material having an upper headrest securing edge, a bottom edge opposite said headrest securing edge, and opposed first and second lateral edges;
    an upholstery contact backing disposed over the entirety of said occupant contact sheet, the backing comprising a soft, resilient, liquid impervious material having a high coefficient of friction for gripping the underlying upholstery of the seat and precluding relative movement therebetween;
    a first and a second headrest securing strap extending upwardly from said headrest securing edge of said occupant contact sheet; and
    each said headrest securing strap having a distal end including mutually mating connection means for removably securing each said headrest securing strap to one another;
    whereby said first and second straps are adapted to be wrapped about the headrest for securing said occupant contact sheet to the vehicle seat when in use; and
    whereby said sheet is adapted to be formed into a roll with said first and second straps wrapped around the roll and said connection means mated, for storage when not in use.

9. The seat cover according to claim 8, wherein each said headrest securing strap is elastic.

10. The seat cover according to claim 8, further including:
    a single, continuous seatback securing strap extending laterally across said at least one upholstery contact sheet, near said headrest securing edge of said occupant contact sheet; and
    a single, continuous seat bottom securing strap extending laterally across said at least one upholstery contact sheet, near bottom edge of said occupant contact sheet.

11. The seat cover according to claim 10, wherein said seatback securing strap and said seat bottom securing strap are each elastic.

12. The seat cover according to claim 8, wherein said occupant contact sheet is formed of materials selected from the group consisting of natural and synthetic woven fabrics.

13. The seat cover according to claim 8, wherein said mutually mating connection means of each said headrest securing strap is selected from the group consisting of side latch buckles, snaps, buttons, and mating hook and loop fabric material.

14. A temporary use seat cover for an upholstered single occupant vehicle seat having a headrest, the seat cover comprising:
    a flexible, substantially rectangular occupant contact sheet of moisture absorbent material having an upper headrest securing edge, a bottom edge opposite said headrest securing edge, and opposed first and second lateral edges;
    a first and a second headrest securing strap extending upwardly from said headrest securing edge of said occupant contact sheet;

each said headrest securing strap having a distal end including mutually mating connection means for removably securing each said headrest securing strap to one another;

a single, continuous seatback securing strap extending laterally across said at least one upholstery contact sheet, near said headrest securing edge of said occupant contact sheet;

a single, continuous seat bottom securing strap extending laterally across said at least one upholstery contact sheet, near said bottom edge of said occupant contact sheet;

whereby said first and second straps are adapted to be wrapped about the headrest for securing said occupant contact sheet to the vehicle seat when in use; and whereby said sheet is adapted to be formed into a roll with said first and second straps wrapped around the roll and said connection means mated, for storage when not in use.

15. The seat cover according to claim 14, further including:

at least one upholstery contact backing disposed over at least a portion of said occupant contact sheet; and said at least one upholstery contact backing comprising a soft, resilient material having a high coefficient of friction for gripping the underlying upholstery of the seat and precluding relative movement therebetween.

16. The seat cover according to claim 15, wherein said at least one upholstery contact backing comprises a single ply of liquid impervious material disposed over the entirety of said occupant contact sheet.

17. The seat cover according to claim 14, wherein each said headrest securing strap is elastic.

18. The seat cover according to claim 14, wherein said seatback securing strap and said seat bottom securing strap are each elastic.

19. The seat cover according to claim 14, wherein said occupant contact sheet is formed of materials selected from the group consisting of natural and synthetic woven fabrics.

20. The seat cover according to claim 14, wherein said mutually mating connection means of each said headrest securing strap is selected from the group consisting of side latch buckles, snaps, buttons, and mating hook and loop fabric material.

* * * * *